United States Patent

Rothenhöfer et al.

Patent Number: 6,047,050
Date of Patent: Apr. 4, 2000

[54] APPARATUS AND METHOD FOR ACCESSING SUBSCRIBER DATA VIA TELECOMMUNICATIONS TERMINALS

[75] Inventors: Karl Rothenhöfer, Leonberg; Helmut Neufeldt, Stuttgart, both of Germany

[73] Assignee: Alcatel, Paris, France

[21] Appl. No.: 09/074,903

[22] Filed: May 8, 1998

[30]    Foreign Application Priority Data

May 20, 1997 [DE]    Germany ............................ 197 20 988

[51] Int. Cl.⁷ .................................................. H04M 15/00
[52] U.S. Cl. .......................... 379/112; 379/111; 379/114; 379/133
[58] Field of Search ........................... 379/111–115, 118, 379/120, 121, 126–127, 133–134, 189, 197–198

[56]    References Cited

U.S. PATENT DOCUMENTS

| | | | |
|---|---|---|---|
| 5,506,893 | 4/1996 | Buscher et al. | 379/114 |
| 5,519,769 | 5/1996 | Weinberger et al. | 379/112 |
| 5,583,918 | 12/1996 | Nakagawa | 379/61 |
| 5,590,180 | 12/1996 | Tonomura et al. | 379/112 |
| 5,745,556 | 4/1998 | Ronen | 379/127 |
| 5,764,741 | 6/1998 | Barak | 379/114 |
| 5,774,530 | 6/1998 | Montgomery et al. | 379/112 |
| 5,805,682 | 9/1998 | Voit et al. | 379/142 |

FOREIGN PATENT DOCUMENTS

| | | |
|---|---|---|
| 0453831 | 10/1991 | European Pat. Off. . |
| 4412727 | 10/1995 | Germany . |
| 4419651 | 12/1995 | Germany . |
| 2294566 | 5/1996 | United Kingdom . |

*Primary Examiner*—Curtis A. Kuntz
*Assistant Examiner*—Duc Nguyen
*Attorney, Agent, or Firm*—Ware, Fressola, Van Der Sluys & Adolphson LLP

[57]    ABSTRACT

A telecommunications network (1) with a switching unit (2, 2', 2") to which at least one telecommunications terminal (3, 3', 3") is connected and which can be operated and maintained from a distance by a host computer (4) via a data link is characterized in that the switching unit (2, 2', 2") has a connection data computer (5) connected thereto which continuously receives from the switching unit (2, 2', 2"), in real time, communication data of the network connections of the telecommunications terminals (3, 3', 3") connected to the switching unit (2, 2', 2") and routes said communication data to the central computer (4) upon request, and that via the switching unit (2, 2', 2") and an on-line data network (6), a bidirectional data link can be established between a telecommunications terminal (3, 3', 3") and the connection data computer (5) for retrieving communication data for the same or another telecommunications terminal (3, 3', 3") connected to the switching unit (2, 2', 2") and/or for requesting services from the network operator. This permits access, particularly indirect access, by the subscriber to the switching unit.

11 Claims, 1 Drawing Sheet

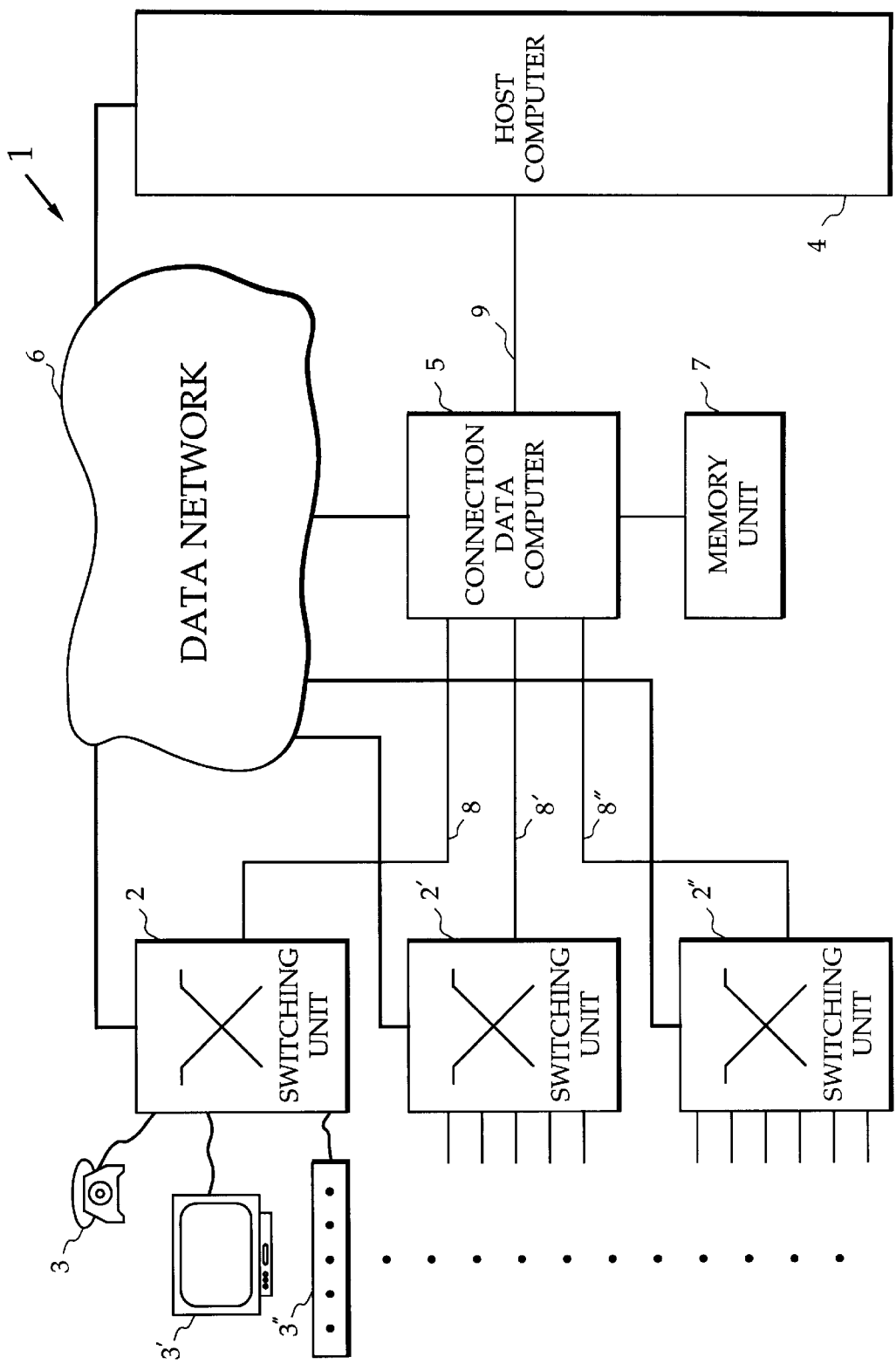

APPARATUS AND METHOD FOR ACCESSING SUBSCRIBER DATA VIA TELECOMMUNICATIONS TERMINALS

BACKGROUND OF THE INVENTION

1. Technical Field

This invention relates to a telecommunications network comprising a switching unit to which at least one telecommunications terminals is connected and which can be operated and maintained from a distance, namely from a host computer, by the operator of the telecommunications network over a data link, with call charge data of subscribers of the telecommunications network being transmittable to the host computer.

Such telecommunications networks are generally known.

2. Discussion of Related Art

The number of service providers which offer telecommunications and other services via telecommunications networks, and the number of such networks, is steadily increasing. The telecommunications networks are not only classical wireline or wireless telephone networks but also "information highways" in a general sense, over which any kind of communicative services can be provided.

As these services generally are not provided free, charges normally have to be paid by the subscriber to the network operator for their use. In the classical telephone network, the subscriber had to be informed about the charges by a monthly telephone bill. If a charge meter was provided at the terminal, the user could monitor the increase of his or her debt by noting down the number of message units indicated per call—an inconvenient procedure. Large customers can also get their telephone bills on CD-ROM, but only after the end of a billing period. So far, only authorized employees of the network operator have direct data access for determining charges accrued since the beginning of the billing period. Such employees, however, are not interested in determining the current debt of a network subscriber who is otherwise unknown to them.

SUMMARY OF INVENTION

The object of the present invention is to provide an apparatus and a method for accessing subscriber data via telecommunications terminals which allows access, particularly indirect access, by the subscriber to the switching unit.

According to the invention, this object is attained in a surprisingly simple and effective manner by providing a telecommunications network of the above kind which is characterized in that the switching unit has a connection data computer connected thereto which continuously receives from the switching unit, in real time, communication data of the telecommunications network connections of the telecommunications terminals connected to the switching unit and routes said communication data to the central computer upon request, and that via the switching unit and an on-line data network, a bidirectional data link can be established between a telecommunications terminal and the connection data computer for retrieving communication data for the same or another telecommunications terminal connected to the switching unit and/or for requesting services from the network operator.

Such a connection data computer can be implemented either with a microprocessor, in which case a plurality of connection data computers is required for large telecommunications networks, or, if the network operator wants to reduce the number of connection data computers, with larger processor units, to each of which a plurality of switching units is connected. In either case, the user of the telecommunications network has direct access from a telecommunications terminal to the connection data computer through the associated switching unit and can retrieve communication data and/or request services from the connection data computer, the retrieved data or the requested services then being switched through the telecommunications network to the telecommunications terminal.

For general management, particularly for the operation and maintenance of the telecommunications network, the host computer is provided, to which the connection data computer routes the communication data either permanently or on request. Conversely, the host computer can route instructions to the connection data computer, which are routed by the latter either to the switching units connected to it or to the telecommunications network. Preferably, the connection between the connection data computer and the host computer and at least one connection between the connection data computer and the switching units will be a direct connection. In addition, however, the connection data computer is connected to the respective switching unit through the telecommunications network. Furthermore, an additional or exclusive connection through the network may be provided between the connection data computer and the host computer.

In a particularly preferred embodiment of the telecommunications network according to the invention, the connection data computer has access to a memory unit in which authorizations for access by telecommunications terminals and/or subscribers of the telecommunications network to communication data are stored. In this manner, access by telecommunications terminals and/or subscribers to communication data can be limited generally and on an individual basis.

As a rule, it will be advantageous to limit the access authorizations to subsets of the entire communication data set which are assigned to the respective authorized subscriber of the telecommunications network and contain data relating to the respective subscriber, while the other communication data, which do not concern the subscriber, remain inaccessible to the latter.

In another particularly preferred embodiment of the invention, a coded authorization credential, preferably in the form of a password, is stored in the memory unit for each authorized subscriber of the telecommunications network and/or for each authorized telecommunications terminal, and the corresponding telecommunications terminal and/or the corresponding subscriber of the telecommunications network is permitted access to communication data by the communication data computer only after entry of the authorization credential.

In a further preferred embodiment, at least one of the telecommunications terminals, which can communicate with the connection data computer, is, or is connected to, a personal computer (PC). For example, a parallel connection of a telephone set with a PC is conceivable, in which case the PC allows the network user particularly simple access to the communication data, while voice input and response via telephone would, on the one hand, involve a considerably greater amount of technical complexity and, on the other hand, be limited to very narrowly restricted standard methods.

According to another advantageous aspect of the invention, features of the services offered by the telecommunications network operator, such as wake-up service, toll-call barring, monitoring functions, etc., can be activated, changed, or deactivated from one or more of the telecommunications terminals via the connection data computer.

A variant may be advantageous in which the connection data computer can be interrogated from one or more of the telecommunications terminals for accrued amounts due to the telecommunications network operator for services provided via the respective telecommunications terminal or via a group of other telecommunications terminals. In this embodiment, however, it is advisable to check an access authorization of the inquiring subscriber before pemitting access to the data. In this manner, the subscriber can constantly inform himself about the costs accruing to him or her and need not wait for a bill to be sent to him or her at the end of the billing period.

In a further particularly preferred embodiment of the invention, an individual data profile of the respective subscriber, individual discounts, special terms of subscription, etc., can be retrieved from the connection data computer by one or more of the telecommunications terminals. Here, too, it is advisable to require the presentation of a password or otherwise check the authorization of the respective subscriber to access the data. It is, of course, also possible for a subscriber to receive information on his or her individual subscriber data profile directly from the network operator or from employees of the latter. However, this is currently done only in writing or by telephone, for which the network operator must assign personnel, most of whom can be saved by the above embodiment of the invention.

The invention further provides a connection data computer for use in a telecommunications network of the above kind which is connected via a direct line and via an on-line data network to at least one switching unit, preferably to a plurality of switching units, and via a further direct line to a host computer. The direct line between the connection data computer and the respective switching unit may be replaced by a connection through the telecommunications network.

The invention further provides a method of operating a telecommunications network and a connection data computer of the above kind wherein communication data are made available in the connection data computer for retrieval by telecommunications terminals connected to the telecommunications network, said communication data comprising the number of each subscriber and the numbers of the other subscribers called by said subscriber in a given period of time, the beginning, duration, and/or end of each switched connection in the telecommunications network, charges accrued in a billing period for one and/or more switched connections in the telecommunications network, service charges, and current tariffs for services offered in the telecommunications network.

A particularly preferred variant of the method according to the invention is characterized in that the connection data computer communicates to an authorized inquiring telecommunications terminal communication data in the form of user statistics, time profiles, and/or graphics. Especially if a PC is used for retrieving the communication data, the latter can be edited and communicated to the user in a particularly comfortable manner.

Further advantages of the invention will become apparent from the description and the drawing. According to the invention, the aforementioned features and the features described below can be used alone or in arbitrary combinations. The invention is not intended to be limited to the embodiments shown and described, but the description is made only by way of example.

BRIEF DESCRIPTION OF THE DRAWING

The invention is illustrated in the accompanying drawing and will now be explained in more detail with reference to one embodiment.

The single FIGURE of the drawing is a schematic block diagram of one embodiment of the telecommunications network according to the invention.

DETAILED DESCRIPTION OF PREFERRED EMBODIMENTS

The telecommunications network 1 includes several switching units 2, 2', 2", to which telecommunications terminals 3, 3', 3", . . . are connected. The switching units 2, 2', 2" switch data connections between different telecommunications terminals via an on-line data network 6. The telecommunications terminals may be terminals of different kinds, such as a telephone 3, a personal computer 3', a fax machine 3", etc.

The telecommunications network 1 is managed and maintained from a distance by means of a host or central computer 4, which may have a direct connection to the on-line data network 6.

Connected between the switching units 2, 2', 2" and the host computer 4 is a connection data computer 5 which, in the embodiment shown, is connected to the switching units 2, 2', 2" by direct connections 8, 8', 8" and to the host computer 4 by a further direct connection 9. A two-way data link also exists between the connection data computer 5 and the on-line data network 6. The connection data computer 5 also has access to a memory unit 7 in which access authorizations of telecommunications terminals 3, 3', 3" and/or subscribers of the telecommunications network 1 are stored.

The connection data computer 5 also has access to current communication data which it is receiving from the switching units 2, 2', 2" over the direct connections 8, 8', 8" on a continuous basis. These communication data include the numbers of the calling and called subscribers of the network, the beginning, duration, and end of each switched call in the telecommunications network 1, charges accrued for one and/or more switched calls in a billing period, service charges, and current tariffs for services offered in the network. Furthermore, in response to an authorized inquiry from a telecommunications terminal 3, 3', 3", which can be authenticated with the aid of a password, for example, communication data in the form of user statistics, time profiles, and/or graphics can be transmitted from the connection data computer 5 to the telecommunications terminals.

Besides managing the communication data and transferring the same to the host computer 4 and to authorized subscribers, the connection data computer 5 performs further server functions, such as acceptance of service requests by subscribers and routing of such requests to the appropriate units, such as the switching units 2, 2', 2".

Thus, in principle, each network subscriber has constant access to his or her subscriber data, particularly to exact call charge data of his or her terminal or other terminals and to his or her traffic profile. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Telecommunications network (1) comprising a switching unit (2, 2', 2") to which at least one telecommunications terminal (3, 3', 3") is connected and which can be operated and maintained from a distance, namely from a host computer (4), by the operator of the telecommunications network over a data link, with call charge data of subscribers of the telecommunications network (1) being transmittable to the host computer (4), characterized in that the switching unit (2, 2', 2") has a connection data computer (5) connected thereto which continuously receives from the switching unit (2, 2', 2"), in real time, communication data of the network connections of the telecommunications terminals (3, 3', 3") connected to the switching unit (2, 2', 2") and routes said communication data to the host computer (4) upon request, and that via the switching unit (2, 2', 2") and an on-line data network (6), a bidirectional data link can be established between a telecommunications terminal (3, 3', 3") and the connection data computer (5) for retrieving communication data for the same or another telecommunications terminal (3, 3', 3") connected to the switching unit (2, 2', 2") and/or for requesting services from the network operator.

2. A telecommunications network as claimed in claim 1, characterized in that the connection data computer (5) has access to a memory unit (7) in which authorizations for access to communication data by telecommunications terminals (3, 3', 3") and/or by subscribers of the telecommunications network are stored.

3. The telecommunications network as claimed in claim 2, characterized in that the access authorizations are limited to subsets of the entire communication data set which are assigned to the respective authorized subscriber of the telecommunications network (1).

4. The telecommunications network as claimed in claim 2, characterized in that in the memory unit (7), a coded authorization credential, preferably in the form of a password, is stored for each authorized subscriber of the telecommunications network (1) and/or for each authorized telecommunications terminal (3, 3', 3"), and that the corresponding telecommunications terminal (3, 3', 3") and/or the corresponding subscriber of the telecommunications network (1) is permitted access to communication data by the connection data computer (5) only after entry of the authorization credential.

5. The telecommunications network as claimed in claim 1, characterized in that at least one of the telecommunications terminals (3, 3', 3"), which can communicate with the connection data computer (5), is, or is connected to, a personal computer (3').

6. The telecommunications network as claimed in claim 1, characterized in that features of the services offered by the telecommunications network operator can be activated, changed, or deactivated from one or more of the telecommunications terminals (3, 3', 3") via the connection data computer (5).

7. The telecommunications network as claimed in claim 1, characterized in that the connection data computer (5) can be interrogated from one or more of the telecommunications terminals (3, 3', 3") for accrued amounts due to the telecommunications network operator for services provided via the respective telecommunications terminal or via a group of other telecommunications terminals.

8. The telecommunications network as claimed in claim 1, characterized in that an individual data profile of the respective subscriber can be retrieved from the connection data computer by one or more of the telecommunications terminals.

9. A connection data computer (5) for use in a telecommunications network (1) as claimed in claim 1, characterized in that the connection data computer (5) is connected via a direct line (8, 8', 8") and via an on-line data network (6) to at least one switching unit (2, 2', 2"), preferably to a plurality of switching units, and via a further direct line (9) to a host computer (4).

10. A method of operating a telecommunications network (1) as claimed in claim 1, characterized in that in the connection data computer (5), communication data are made available for retrieval by telecommunications terminals (3, 3', 3") connected to the telecommunications network (1), said communication data comprising the number of each subscriber and the numbers of the other subscribers called by said subscriber in a given period of time, the beginning, duration, and/or end of each switched connection in the telecommunications network (1), charges accrued in a billing period for one and/or more switched connections in the telecommunications network (1), service charges, and current tariffs for services offered in the telecommunications network (1).

11. The method as claimed in claim 10, characterized in that the connection data computer (5) communicates to an authorized inquiring telecommunications terminal (3, 3', 3") communication data in the form of user statistics, time profiles and/or graphics.

* * * * *